(12) United States Patent
Yetukuri et al.

(10) Patent No.: US 6,899,395 B2
(45) Date of Patent: May 31, 2005

(54) CAM-DRIVEN FOUR-WAY HEAD RESTRAINT ASSEMBLY

(75) Inventors: Nagarjun Yetukuri, Rochester Hills, MI (US); Mark Farquhar, Ortonville, MI (US); Dale Smallwood, Clarkston, MI (US); Paul Wier, Washington, MI (US); Kenneth McQueen, Leonard, MI (US); Michael Phan, Pontiac, MI (US)

(73) Assignee: Lear Corporation, Southfield, MI (US)

( * ) Notice: Subject to any disclaimer, the term of this patent is extended or adjusted under 35 U.S.C. 154(b) by 39 days.

(21) Appl. No.: 10/695,331

(22) Filed: Oct. 28, 2003

(65) Prior Publication Data

US 2005/0088027 A1   Apr. 28, 2005

(51) Int. Cl.[7] ............................................. B60N 2/48
(52) U.S. Cl. ..................................... 297/408; 297/410
(58) Field of Search ................................ 297/408, 410

(56) References Cited

U.S. PATENT DOCUMENTS

| | | | | |
|---|---|---|---|---|
| 3,603,642 A | * | 9/1971 | Laessker ..................... | 297/408 |
| 3,655,241 A | * | 4/1972 | Herzer et al. ............... | 297/408 |
| 4,123,104 A | | 10/1978 | Andres et al. .............. | 297/391 |
| 4,190,291 A | | 2/1980 | Korger ....................... | 297/408 |
| 4,191,422 A | | 3/1980 | Inasawa et al. ............. | 297/391 |
| 4,304,439 A | | 12/1981 | Terada et al. ............... | 297/409 |
| 4,600,240 A | * | 7/1986 | Suman et al. ............... | 297/408 |
| 4,657,304 A | | 4/1987 | Heesch et al. .............. | 297/391 |
| 4,682,817 A | | 7/1987 | Freber ........................ | 297/408 |
| 4,685,737 A | * | 8/1987 | Deley et al. ................ | 297/408 |
| 4,762,367 A | | 8/1988 | Denton ....................... | 297/409 |
| 4,834,456 A | | 5/1989 | Barros et al. ............... | 297/403 |
| 4,861,107 A | | 8/1989 | Vidwans et al. ............ | 297/408 |
| 5,145,233 A | | 9/1992 | Nagashima ................. | 297/408 |
| 5,199,765 A | | 4/1993 | Garmendia et al. ......... | 297/391 |
| 6,000,760 A | | 12/1999 | Chung ........................ | 297/408 |
| 6,007,154 A | | 12/1999 | Parker et al. ............... | 297/410 |
| 6,062,644 A | | 5/2000 | Lance ......................... | 297/410 |
| 6,471,296 B2 | | 10/2002 | Lance ......................... | 297/410 |
| 6,499,805 B1 | * | 12/2002 | Watadani .................... | 297/408 |
| 6,533,359 B1 | | 3/2003 | Holstensson ................ | 297/391 |
| 6,719,373 B2 | * | 4/2004 | Zimmermann ............. | 297/410 |
| 2001/0028191 A1 | | 10/2001 | Lance ......................... | 297/410 |

FOREIGN PATENT DOCUMENTS

| | | | |
|---|---|---|---|
| EP | 0 352 234 | | 1/1990 |
| GB | 2161702 | * | 1/1986 |
| GB | 2 240 920 A | | 8/1991 |
| JP | 5-329032 | * | 12/1993 |
| JP | 2000060678 | | 8/1998 |

* cited by examiner

Primary Examiner—Peter R. Brown
(74) Attorney, Agent, or Firm—Bliss McGlynn, P.C.; Bill Panagos

(57) ABSTRACT

The present invention relates to a head restraint assembly providing four-way adjustment and having dual positive stops as well as a single ergonomic control. The present invention includes a frame and a housing that engages a portion of the frame. The present invention further includes a cam assembly disposed within the housing to provide fore/aft adjustment of the housing relative to the frame. The cam assembly includes a camshaft and at least two drum assemblies supported by the camshaft. The cam assembly further includes a contact plate extending parallel to the camshaft to releasably engage the drum assemblies. The camshaft is connected to the contact plate to provide releasable engagement between the contact plate and the drum assemblies. The present invention further includes a control member to engage the cam assembly and provide for fore/aft and vertical adjustment in response to user input.

20 Claims, 2 Drawing Sheets

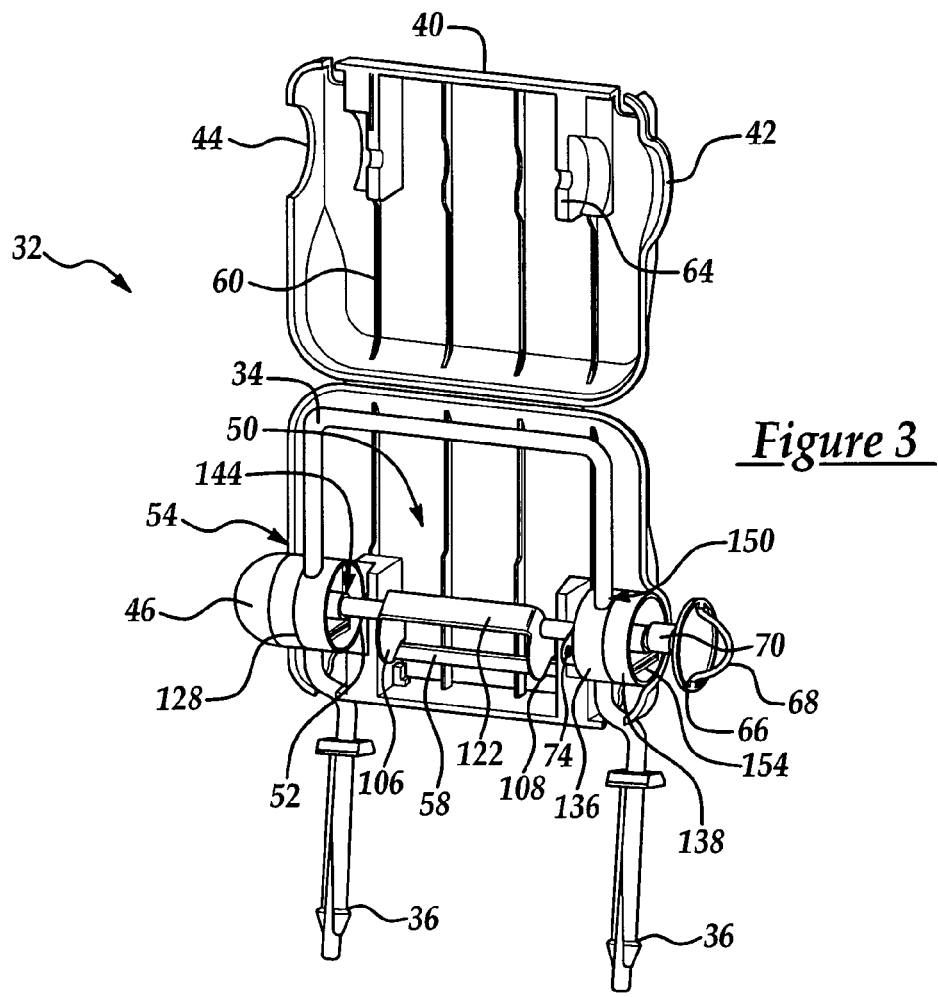
*Figure 3*
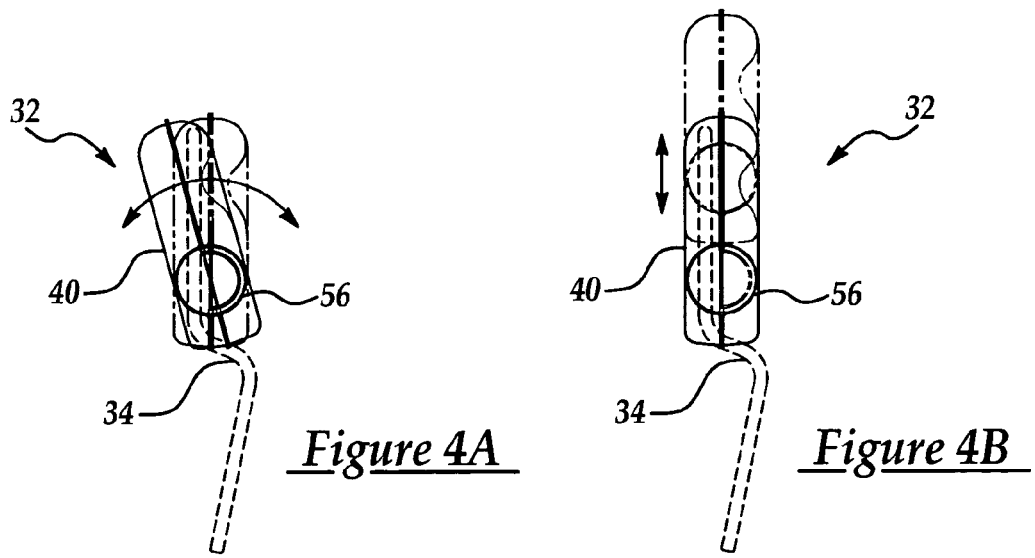
*Figure 4A*  *Figure 4B*

CAM-DRIVEN FOUR-WAY HEAD RESTRAINT ASSEMBLY

BACKGROUND OF THE INVENTION

1. Field of the Invention

The present invention relates, generally, to a head restraint assembly for a vehicle seat. More specifically, the present invention relates to a cam-driven four-way head restraint assembly for a vehicle seat that provides a single control for cam-driven, four-way adjustment and incremental dual positive stops at each adjustment location.

2. Description of the Related Art

Conventional vehicle seat designs of the type commonly found in the related art typically include a seatback assembly, a lower seat assembly, recliner mechanism, manual or power adjustment mechanism for adjusting a number of positions of either the seatback or lower seat assemblies, as well as a number of safety features including occupant restraint devices such as seatbelts. The seatback assembly also includes a head restraint that is typically mounted at the top or upper end of the seatback.

Head restraint assemblies for vehicle seats are commonly known and widely used throughout the automotive industry. Head restraint assemblies generally provide comfort and support for the head of the occupant of the seat. Head restraint assemblies may also serve as a restraint to minimize the backward movement of the seat occupant's head during vehicle impact or sudden vehicle movement. In either event, head restraint assemblies are generally removably secured to the seat back through a post or posts which enable the head restraint assembly to be vertically adjusted relative to the seat back in a predetermined number of positions.

While some head restraints assemblies employ a motor for two-way vertical adjustment, manually moving the head restraint assembly is the general method for adjusting the head restraint assembly. Manual upward vertical adjustment of a head restraint assembly is generally accomplished by lifting the head restraint assembly to a desired position. However, manual downward vertical adjustment of a head restraint assembly is generally accomplished by releasing a locking mechanism which secures the head restraint assembly at a given position and then manually lowering the head restraint assembly. During vertical adjustment of the head restraint assembly, the distance between the head of the seat occupant and the head restraint assembly remains more or less the same, given the angle of the seat back relative to the seat. This distance is commonly referred to as, "backset" or "backset length."

Head restraint assemblies having additional adjustment capabilities in the fore/aft direction relative to the head of a seat occupant are known in the related art and may provide four-way adjustment (up, down, fore and aft). Fore/aft movement may be provided to afford the seat occupant with an additional feature that allows for a more tailored seat comfort. Fore/aft adjustment of a head restraint assembly may also be included to reduce backset length, thereby further minimizing the speed and distance traveled by the head and neck in the event of a rear impact or sudden movement of the vehicle.

A number of fore/aft adjustment mechanisms for head restraint assemblies have been proposed in the related art. For example, U.S. Pat. No. 4,123,104 issued to Andres et al. on Oct. 31, 1978 employs an inflatable bellows to provide adjustable fore/aft movement of a headrest. The seat occupant is not required to manually adjust the headrest assembly, but rather engages a button or switch to control the fore/aft movement. However, the Andres et al. device requires complex components, such as a bellows and a motor to accomplish the fore/aft movement.

U.S. Pat. No. 4,861,107 issued to Vidwans et al. on Aug. 29, 1989 employs a friction hinge to provide adjustable fore/aft movement of a headrest. The Vidwans et al. device is manually adjusted by the seat occupant exerting force on the headrest to position the headrest in the desired fore or aft position. The Vidwans et al. device maintains the desired fore or aft position as a result of the tension within the friction hinge. However, the Vidwans et al. device does not provide a positive stop that secures and maintains the headrest in the desired fore or aft position during sudden movement or rear impact of a vehicle.

U.S. Pat. No. 6,000,760 issued to Chung on Dec. 14, 1999 employs an internal ratchet member to provide fore/aft adjustment of a headrest. The internal ratchet member of the Chung device is a directional locking mechanism that permits the seat occupant to manually adjust the headrest assembly in the aft direction without a positive stop at any of the predetermined fore/aft positions. To adjust the headrest from an aft position to a fore position, the headrest assembly must be fully extended in the aft direction to disengage the internal ratchet member, then returned to the foremost position to re-engage the internal ratchet member. Finally, the headrest assembly may be adjusted to the desired position. The Chung device provides a single positive stop of the headrest assembly at each of the fore/aft positions, but only in the fore direction. However, this is opposite to the direction necessary for providing restraint to the head of a seat occupant upon rear impact or other sudden forward vehicle movement. Additionally, the Chung device requires that a seat occupant undergo a series of steps to adjust the headrest assembly from an aft position to a fore position which is ergonomically undesirable.

U.S. Pat. No. 6,533,359 issued to Holstensson on Mar. 18, 2003 employs a rotatable horizontal screw to provide fore/aft movement of a headrest assembly. The rotatable screw of the Holstensson device permits a seat occupant to manually adjust the headrest assembly in either a fore or an aft direction by turning a knob behind the headrest pad, which adjusts the angle of externally located link arms that connect the headrest pad to the headrest post. While the Holstensson device may provide a positive stop of the headrest assembly in fore/aft positions, the fore/aft adjustment is limited to small incremental movements governed by the rate at which the seat occupant rotates the knob. This limitation may be ergonomically undesirable when adjusting from an aft-most position to a foremost position or vice versa. Further, the Holstensson device employs separate controls for the fore/aft movement and the vertical movement. This results in a device that is overly complex and ultimately less cost effective to assemble.

While the head restraint assemblies providing four-way adjustment of the type known in the related art have generally worked for their intended purposes, they suffer from the disadvantage that they generally fail to provide a positive stop or provide only a single positive stop or a positive stop in the opposite direction with respect to movement of the head and neck in the event of a sudden rear impact or forward acceleration. In addition, the head restraint assemblies providing four-way adjustment of the type known in the related art also suffer from undesirable ergonomic features and/or complex assemblies including motors and control components.

Thus, there remains a need in the art for a head restraint assembly that provides four-way adjustment that includes a dual positive stop for both vertical and fore/aft movement. In addition, there remains a need for a head restraint assembly providing four-way movement relative to a seat occupant having a simpler assembly and a single ergonomic control that efficiently adjusts the head restraint assembly in all four directions.

SUMMARY OF THE INVENTION

The present invention overcomes the disadvantages in the related art in head restraint assemblies for vehicle seats and generally fulfills a need in the art for a head restraint assembly that provides four-way adjustment having dual positive stops for each position in all directions as well as a single ergonomic control for all four adjustment directions. To this end, the head restraint assembly of the present invention includes a frame adapted to operatively engage the seat back of a vehicle and a housing adapted to operatively engage a portion of the frame. The housing includes at least one aperture disposed along a horizontal axis perpendicular to the frame. The present invention further includes a cam assembly disposed within the housing adapted to provide fore/aft adjustment of the housing relative to the frame. The cam assembly includes a camshaft extending along the horizontal axis and at least two drum assemblies operatively supported by the camshaft. The cam assembly further includes a contact plate extending parallel to the camshaft and adapted to releasably engage the drum assemblies. The camshaft is operatively connected to the contact plate to provide releasable engagement between the contact plate and the drum assemblies. The present invention further includes a control member adapted to operatively engage the cam assembly and provide for fore/aft and vertical adjustment in response to user input.

Accordingly, one advantage of the present invention is that it provides fore/aft movement of the head restraint including positive stops for improved head restraint position retention.

Another advantage of the present invention is that it provides dual positive stop mechanisms to improve positive stops at predetermined fore/aft adjustment positions.

Yet another advantage of the present invention is that it provides a single control for both vertical and fore/aft movement of the head restraint assembly which improves the aesthetic appearance as well as ergonomic operation of the head restraint movement.

Still another advantage of the present invention is that it provides dual positive stop mechanisms to improve releasable locking at predetermined vertical adjustment positions.

Still another advantage of the present invention is that it provides universal parts for an opposable build operation which reduces manufacturing and assembly time and cost.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 3 is an enlarged perspective view of the head restraint assembly with the housing "opened" to show the components supported therein.

FIG. 4A is a side view illustrating the fore-aft adjustment of the present invention.

FIG. 4B is a side view illustrating the vertical adjustment of the present invention.

DETAILED DESCRIPTION OF THE INVENTION

Figure 1:
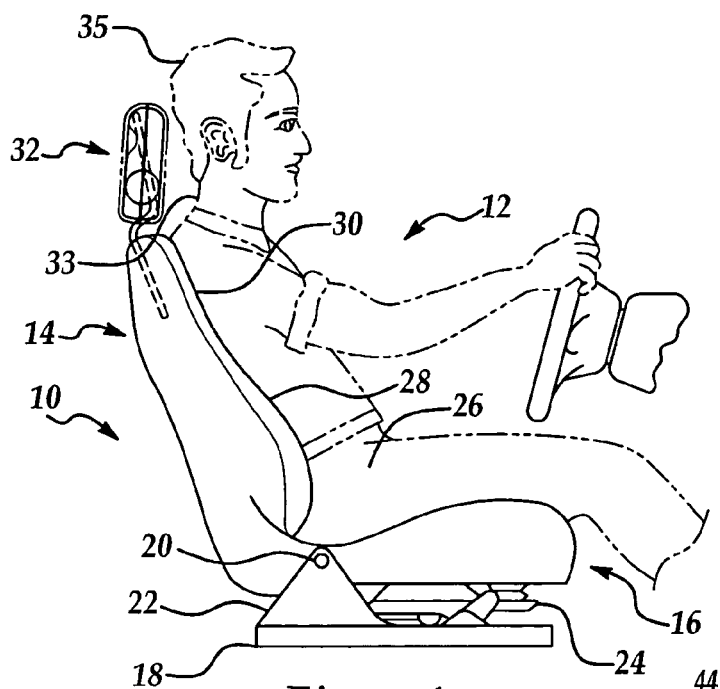
FIG. 1 is an environmental view of a vehicle seat including a head restraint assembly in accordance with an embodiment of the present invention.

Referring now to the drawings where like numerals are used to designate like structure throughout the figures, a vehicle seat of the type that may employ a head restraint assembly of the present invention is generally indicated at 10 in FIG. 1. A theoretical "occupant" is schematically indicated at 12 and is shown in what could be referred to as a "normal driving position." The vehicle seat 10 includes a seatback, generally indicated at 14, a lower seat assembly, generally indicated at 16 that is supported on a seat track 18, as is commonly known in the art. The seatback 14 may be pivotally connected about a pivot point 20 to the lower seat assembly 16 by means of a bracket 22 that forms a part of the seat track mechanism 18. In this way, the seat assembly 10 may be adapted to recline or adjust in a number of ways that are commonly known in the art. Furthermore, the lower seat assembly 16 may also include some sort of suspension or support mechanism 24 that adds comfort to the occupant, as is also well known in the art. In addition to these common elements, the vehicle seat 10 may include various controls and restraint systems, such as seatbelts, etc. that are not shown but that are well known in the art.

The occupant 12 has a pelvis region 26, a lumbar region 28, and a thoracic region 30. In addition, the occupant 12 is shown having a neck 33 and head 35. The seatback 14 has similar regions that correspond to the relevant anatomical regions of the occupant 12. Further, the head restraint assembly of the present invention, generally indicated at 32, corresponds to the neck 33 and head 35 regions of the occupant 12. As shown in FIG. 1, the head restraint assembly 32 is shown for use in connection with the driver's seat. However, those having ordinary skill in the art will appreciate that the head restraint assembly 32 of the present invention may be adapted for use in connection with a vehicle seat 10 located anywhere within a vehicle. Further, as generally known in the art, the head restraint assembly is covered in a foam padding and coverstock material. Additionally, as described in greater detail below, the components of the head restraint assembly 32 of the present invention are adapted for opposable build construction to provide efficient manufacturing and assembly.

Figure 2:
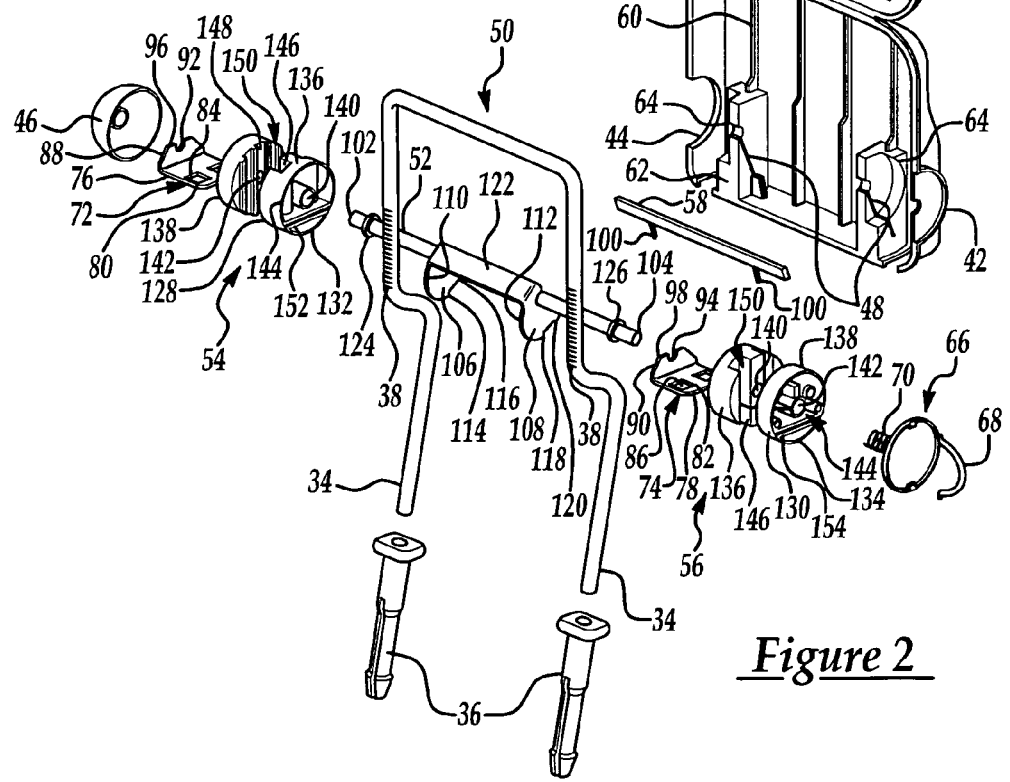
FIG. 2 is an enlarged exploded view of the head restraint assembly of the present invention.

As shown in FIGS. 2 and 3, the head restraint assembly 32 includes a frame 34 adapted to operatively engage the seatback 14 of a vehicle seat 10. The head restraint assembly 32 may be operatively engaged to head restraint guideposts 36 disposed within the seatback 14 and adapted to receive the frame 34. The frame 34 includes a plurality of notches 38 extending along a vertical axis in spaced relation relative to each other. The notches 38 are adapted to provide a slide-over feature when vertically adjusting the head restraint assembly 32 in the upward direction relative to the seatback 14 as will be described in greater detail below.

The head restraint assembly 32 further includes a housing 40 adapted to operatively receive a portion of the frame 34. The housing 40 includes at least one aperture 42 disposed along a horizontal axis perpendicular to the frame 34. In the preferred embodiment, the housing 40 includes two apertures 42, 44 aligned with respect to each other to provide for opposable build assembly. Where the housing 40 includes two apertures 42, 44, one aperture 44 may be closed through the employment of an end cap 46. The housing 40 further includes a plurality of slots 48 disposed within the interior of the housing adapted for use in connection with the cam assembly, generally indicated at 50. The cam assembly 50 includes a camshaft 52, at least two drum assemblies 54, 56 and a contact plate 58, all of which will be discussed in greater detail below. As further shown in FIGS. 2 and 3, the housing 40 includes support ribs 60 adapted to add structural support to the housing 40, and platforms 62 including a plurality of rests 64 adapted to receive the drum assemblies 54 and camshaft 52.

The head restraint assembly 32 of the present invention further includes a control member 66 adapted to operatively engage the cam assembly 50 to provide fore and aft adjustment as well as vertical adjustment in response to user input. The control member 66 is adapted to move in both a rotational and axial direction, simultaneously or independently to control both the fore and aft adjustment and the vertical adjustment of the head restraint assembly 32. As shown in the Figures, the control member 66 includes a D-ring 68 that the seat occupant 12 engages to actuate the control member 66, thereby adjusting the head restraint assembly 32. However, those having ordinary skill in the art will appreciate that the D-ring 68 may be substituted with a lever, knob or the like that is adapted to actuate the control member 66 in both rotational and axial movement. The control member 66 further includes a biasing member 70 that provides resilient communication between the control member 66 and the cam assembly 50 in response to input from the seat occupant 12. As will be described in greater detail below, the biasing member 70 operates to return the control member 66 from a position that enables vertical adjustment of the head restraint assembly 32 to a position that prevents such adjustment when the seat occupant 12 no longer contacts the D-ring 68. The control member 66 is also returned from a position that enables fore and aft adjustment of the head restraint assembly 32 to a position that prevents such adjustment when the seat occupant 12 no longer contacts the D-ring 68 through another biasing force discussed in greater detail below. Those having ordinary skill in the art will appreciate that the control member 66 may also include a dampener, not shown but generally known in the art, to provide fluid resilient movement during rotational or axial movement.

The head restraint assembly 32 further includes at least two slide carriages generally indicated at 72, 74. Each slide carriage 72, 74 includes a base 76, 78 operatively connected to a drum assembly 54, 56. The base 76, 78 includes at least one orifice 80, 82 that receives the frame 34. The base 76, 78 further includes at least one engaging surface 84, 86 defined by the orifice 80, 82 that acts to releasably engage the notches 38, thereby providing a positive stop for each adjustment position of the head restraint assembly 32 in the vertical direction. As commonly known in the art, the engaging surface 84, 86 and the notches 38 are adapted to provide what is commonly referred to as a "slide-over" feature that enables a seat occupant 12 to vertically adjust the head restraint assembly 32 upwardly, away from the seatback 14, without the need to engage the control member 66. However, when attempting to vertically adjust the head restraint assembly 32 downwardly, toward the seat back 14, the seat occupant 12 must engage the control member 66 to release the contact between the engaging surface 84, 86 and a notch 38.

Each of the slide carriages 72, 74 further includes at least one sidewall 88, 90 extending from the base 76, 78 and fixedly supported relative to the camshaft 52. The sidewall 88, 90 of each slide carriage 72, 74 further includes an engaging member 92, 94 that communicates with the camshaft 52 during vertical adjustment of the head restraint assembly 32 relative to the seatback 14. As shown in FIGS. 2 and 3, the engaging member 92, 94 is a semicircular rest defined along the terminal end 96, 98 of the sidewall 88, 90. However, those having ordinary skill in the art will appreciate that the engaging member 92, 94 may include an opening within the sidewall 88, 90 adapted to receive the camshaft 52. In either event, the engaging member 92, 94 facilitates movement of the slide carriage 72, 74 for vertical adjustment of the head restraint assembly 32 as shown in FIG. 4B. More specifically, as the seat occupant 12 engages the control member 66, the biasing member 70 compress and the camshaft 52 moves in an axial direction, communicating with the engaging member 92, 94 and causing the slide carriage 72, 74 to move in a likewise axial direction. The axial movement of the slide carriage 72, 74 releases engagement between the engaging surface 84, 86 and a notch 38 of the frame 34, permitting vertical adjustment of the head restraint assembly 32. Upon release of the control member 66 by the seat occupant 12, the biasing member 70 decompresses to move the camshaft 52, and slide carriage 72, 74 (via the engaging member 92, 94), in a return axial direction, thereby causing the engaging surface 84, 86 to engage a notch 38 of the frame 34, locking the head restraint assembly 32 in a vertical position. While the biasing member 70 of the present invention is show associated with the control member 66, those having ordinary skill in the art will appreciate that the biasing member may be employed anywhere within the present invention to accomplish the same end. By way of example, the biasing member 70 may be located between the sidewall 88, 90 and the drum assembly 54, 56 or located between the sidewall 88, 90 and the platforms 62.

Referring now to FIGS. 2 and 3, the cam assembly 50 is disposed within the housing 40 and adapted to provide fore/aft adjustment of the housing 40 relative to the frame 34. The contact plate 58 of the cam assembly 50 extends parallel to the camshaft 52 and is adapted to releasably engage the drum assemblies 54, 56. The contact plate 58 is operatively supported by slots 48 located within the housing 40 to provide controlled movement of the contact plate 58, thereby maintaining the relationship between the contact plate 58 and the camshaft 52 as well as the relationship between the contact plate 58 and the drum assemblies 54, 56. The contact plate 58 further includes a tension member 100 adapted to provide tension against the contact plate 58, thereby maintaining contact between the contact plate 58 and the drum assemblies 54, 56. The tensional contact between the contact plate 58 and the drum assemblies 54, 56 provides a releasably locking positive stop for each adjustment position of the head restraint assembly 32 in both the fore and aft direction. As shown in FIGS. 2 and 3, the tension member 100 is two springs adapted to provide resistance against the contact plate 58; however, those having ordinary skill in the art will appreciate that the tension member 100 may include only one spring or other component adapted to provide tension against the contact plate 58.

Further, as shown in FIGS. 2 and 3, the camshaft 52 of the cam assembly 50 extends along a horizontal axis of the housing 40. The camshaft 52 includes terminal ends 102, 104 adapted to engage the control member 66 and the end cap 46, thereby enabling the seat occupant 12 to actuate the camshaft 52 through movement of the control member 66. The camshaft 52 further includes at least two cam lobes 106, 108 disposed along the camshaft 52. The cam lobes 106, 108 operatively engage the contact plate 58 to facilitate releasable engagement between the contact plate 58 and the drum assemblies 54, 56 to provide fore/aft adjustment of the head restraint assembly 32 as shown in FIG. 4A. Specifically, rotation of the control member 66 by the seat occupant 12 rotates the camshaft 52 and the cam lobes 106, 108 in particular. The cam lobes 106, 108 engage the contact plate 58 in a manner that compresses the tension member 100, thereby releasing the operative engagement between the contact plate 58 and the drum assemblies 54, 56. Likewise, the control member 66 is returned to a position that locks or otherwise operatively engages the contact plate 58 to the drum assemblies 54, 56 when the seat occupant 12 releases the control member 66 and the compressed tension member 100 exerts force on the contact plate 58, which rotates the camshaft 52 and control member 66 in a return motion.

The cam lobes 106, 108 include an arcuate outer surface 110, 112 having at least two tangs 114, 116, 118, 120. The tangs 114, 116, 118, 120 define the field of mechanical communication between the camshaft 52 and the contact plate 58. Specifically, as the cam lobes 106, 108 rotate to compress the contact plate 58 against the tension member 100 and release the engagement between the contact plate 58 and the drum assemblies 54, 56, one of the tangs 116, 120 on each cam lobe 106, 108 prevents the contact plate 58 from extending beyond a predetermined point along the arcuate outer surface 110, 112 where compression of the contact plate 58 would be lost and the contact plate 58 would once again engage the drum assemblies 54, 56. The other tangs 114, 118 on each cam lobe 106, 108 prevent the contact plate 58 from extending beyond a predetermined point along the arcuate surface 110, 112 where the contact plate 58 would fail to engage the cam lobes 106, 108.

The camshaft 52 further includes a bridge 122 disposed between the cam lobes 106, 108. The bridge 122 is adapted to provide structural support to the cam lobes 106, 108. However, those having ordinary skill in the art will appreciate that a bridge 122 may not be a necessary component as the cam lobes 106, 108 may be constructed of material having suitable strength so as not to require a supportive bridge 122. Moreover, the bridge 122 may be replaced by support beams or the like which may be secured to the camshaft 52 rather that disposed between the two cam lobes 106, 108. Further, those having ordinary skill in the art will appreciate that the head restraint assembly 32 of the present invention may employ only one cam lobe of sufficient dimensions and material to facilitate movement of the contact plate 58 against the tension member 100 to provide the releasable engagement between the contact plate 58 and the drum assemblies 54, 56 for adjustment in the fore and aft direction.

The camshaft 52 further includes standoffs 124, 126 that have a function that is similar to the tangs 114, 116, 118, 120 of the cam lobes 106, 108. The standoffs 124, 126 are annularly disposed about the camshaft 52 and adapted to limit the axial movement of the slide carriage sidewall 88, 90 as briefly described above. Specifically, as the seat occupant 12 actuates axial movement of the camshaft 52 through movement of the control member 66; the biasing member 70 is compressed and the standoffs 124, 126 contact the engaging members 92, 94 of the slide carriages 72, 74, moving the slide carriages 72, 74 from a position of operative engagement with the frame notches 38 to a released position for vertical adjustment of the head restraint assembly 32. Further, when the seat occupant 12 releases the control member 66, the biasing member 70 exerts forces on the control member 66, which creates a return axial movement of the camshaft 52, causing the standoffs 124, 126 to once again engage the engaging members 92, 94 and return the slide carriages 72, 74 to a position of operative engagement with the notches 38 of the frame 34.

As noted above, the cam assembly 50 further includes at least two drum assemblies 54, 56 that are operatively supported by the camshaft 52. The drum assemblies 54, 56 include an annular outer surface 128, 130 about which the housing 40 may rotate during fore/aft adjustment of the head restraint assembly 32 relative to the head 35 and neck 33 of the occupant 12. The annular outer surface 128, 130 includes a plurality of aligned detents 132, 134 in spaced relation relative to each other to define a predetermined number of fore/aft adjustment positions. The detents 132, 134 are adapted to receive a portion of the contact plate 58 to provide a positive stop for each adjustment position of the head restraint assembly 32 in both the fore and aft direction. Specifically, the contact plate 58 is received within the detents 132, 134 and operatively supported therein through tension exerted against the contact plate 58 by the tension member 100. The contact plate 58 releases from within the detent 132, 134 when the tension member 100 is compressed by rotation of the cam lobes 106, 108.

The drum assemblies 54, 56 further include a drum 136 and a drum sleeve 138 in mating relation to each other which may be achieved though interlocking features, screws (not shown), adhesive, or other manner commonly known in the art. The drum 136 includes a port 140 and the drum sleeve 138 includes a bore 142. Both the port 140 and the bore 142 are aligned with the horizontal axis of the housing 40 and cooperate to define a duct 144 extending through the drum assemblies 54, 56. The duct 144 is adapted to receive the terminal ends 102, 104 of the camshaft 52. Specifically, terminal ends 102, 104 of the camshaft 52 extend through the duct 144 and engage the end cap 46 and control member 66. Furthermore, the drum 136 includes a channel 146 and the drum sleeve 138 includes a groove 148. The channel 146 and the groove 148 extend parallel to the frame 34 and cooperate to define a conduit 150 extending through the drum assemblies 54, 56. The conduit 150 is adapted to receive the frame 34, thereby maintaining the drum assemblies 54, 56 in a stationary position relative to the housing 40 during adjustment of the head restraint assembly 32 in the fore and aft direction. Those having ordinary skill in the art will appreciate that while the drum assemblies 54, 56 of the present invention include a drum 136 and a drum sleeve 138, the drum assemblies 54, 56 do not require a two-piece construction and may simply consist of a single-piece drum assembly construction.

The drum assemblies 54, 56 further include an elongate passage 152, 154 extending parallel to the duct 144. The elongate passage 152, 154 is adapted to receive the base 76, 78 of the slide carriage 72, 74 to maintain a fixed relationship between the base 76, 78 and the frame 34. When moved in this way, the orifice 80, 82 of the base 76, 78 is aligned with the conduit 150 such that the frame 34 extends through both the conduit 150 and the orifice 80, 82. Thus, the relationship between the orifice 80, 82 and the frame 34 is maintained through axial movement of the base 76, 78 within the elongate passage 152, 154 during vertical adjustment of the head restraint assembly 32. Those having ordinary skill in the art will appreciate that while the drum assemblies 54, 56 include an elongate passage 152, 154 adapted to receive the base 76, 78 of the slide carriages 72, 74 to maintain the relationship between the orifice 80, 82 and the frame 34, the relationship may be maintained through any number of ways without employing an elongate passage 152, 154 within the drum assemblies 54, 56. By way of example, the base 76, 78 of the slide carriages 72, 74 may be located below the drum assemblies 54, 56 and the relationship between the orifice 80, 82 and the frame 34 maintained by guides disposed within the housing 40. Further by way of example, the relationship may also be maintained in such a way that the engaging member 92, 94 of the slide carriages 72, 74 surrounds the camshaft 52, as described above, thereby suspending the base 76, 78 from the sidewall 88, 90.

Thus, the head restraint assembly 32 of the present invention provides fore/aft movement including positive stops for improved head restraint position retention. Further, the head restraint assembly 32 of the present invention provides dual positive stop mechanisms to improve positive stops at predetermined fore/aft adjustment positions. The head restraint assembly 32 of the present invention also provides a single control 66 for both vertical and fore/aft movement which improves the aesthetic appearance as well as ergonomic operation of head restraint movement. The head restraint assembly 32 of the present invention also provides dual positive stops to improve positive stops at predetermined vertical adjustment positions. The head restraint assembly 32 of the present invention further provides components for an opposable build operation which reduces manufacturing and assembly time and cost.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A head restraint assembly adapted to operatively engage the seat back of a vehicle seat and provide four-way adjustment, said head restraint assembly comprising:
   a frame adapted to operatively engage the seat back of a vehicle;
   a housing adapted to operatively engage a portion of said frame, said housing including at least one aperture disposed along a horizontal axis perpendicular to said frame;
   a cam assembly disposed within said housing adapted to provide fore/aft adjustment of said housing relative to said frame, said cam assembly including a camshaft extending along the horizontal axis and at least two drum assemblies operatively supported by said camshaft, said cam assembly further including a contact plate extending parallel to said camshaft and adapted to releasably engage said drum assemblies, said camshaft operatively connected to said contact plate to provide releasable engagement between said contact plate and said drum assemblies; and
   a control member adapted to operatively engage said cam assembly and provide for fore/aft and vertical adjustment in response to user input.

2. The head restraint assembly as set forth in claim 1 wherein said cam assembly further includes at least two cam lobes disposed along said camshaft, said cam lobes adapted to operatively engage said contact plate to releasably engage said drum assemblies thereby providing fore/aft adjustment of said housing about said drum assemblies.

3. The head restraint assembly as set forth in claim 2 wherein said cam lobes include an arcuate outer surface having at least two tangs adapted to define the field of mechanical communication between said camshaft and said contact plate.

4. The head restraint assembly as set forth in claim 2 further includes a bridge disposed between said lobes, said bridge adapted to provide structural support to said lobes.

5. The head restraint assembly as set forth in claim 1 wherein each of said drum assemblies include an annular outer surface about which said housing may rotate during fore/aft adjustment of said head restraint assembly.

6. The head restraint assembly as set forth in claim 5 wherein said annular outer surface includes a plurality of aligned detents in spaced relation relative to each other to define a predetermined number of fore/aft adjustment positions, said detents adapted to receive a portion of said contact plate to provide a positive stop for each adjustment position in both the fore and aft direction.

7. The head restraint assembly as set forth in claim 1 wherein said drum assemblies further include a drum, a drum sleeve in mating relation to said drum, a duct extending through said drum assemblies adapted to receive the terminal ends of said camshaft and a conduit extending through said drum assemblies adapted to receive said frame.

8. The head restraint assembly as set forth in claim 7 wherein said drum includes a port aligned with the horizontal axis of said housing and a channel parallel to said frame; said drum sleeve including a bore aligned with the horizontal axis of said housing and a groove parallel to said frame aligned with said channel, said port and said bore cooperating to define said duct and said channel and said groove cooperating to define said conduit.

9. The head restraint assembly as set forth in claim 1 further including at least two slide carriages, each of said slide carriages including a base operatively connected to said drum assembly, and at least one sidewall extending from said base, said sidewall fixedly supported relative to said camshaft.

10. The head restraint assembly as set forth in claim 9 wherein said frame includes a plurality of notches extending along a vertical axis in spaced relation relative to each other, said base of said slide carriage including at least one orifice adapted to receive said frame and at least one engaging surface defined by said orifice and adapted to releasably engage said notches to provide a positive stop for each adjustment position in the vertical direction.

11. The head restraint assembly as set forth in claim 9 wherein said camshaft further includes at least two standoffs annularly disposed about said camshaft, said sidewall of said slide carriages further including an engaging member adapted to communicate with said camshaft through axial movement between said standoff and a terminal end of said camshaft during vertical adjustment of said head restraint assembly.

12. The head restraint assembly as set forth in claim 9 wherein said drum assemblies further include an elongate passage adapted to receive said base of said slide carriage to maintain a fixed relationship between said base and said frame.

13. The head restraint assembly as set forth in claim 1 wherein said contact plate includes a tension member adapted to provide tension between said contact plate and said drum assemblies to provide a releasably locking positive stop for each adjustment position in both the fore and aft direction.

14. The head restraint assembly as set forth in claim 1 wherein said control member includes a biasing member adapted to provide resilient communication between said control member and said cam assembly in response to user input.

15. The head restraint assembly as set forth in claim 1 wherein said housing further includes a plurality of slots adapted to receive said contact plate to maintain the relationship between said contact plate and said camshaft and said contact plate and said drum assemblies.

16. A vehicle seat having a head restraint assembly adapted to operatively engage the seat back of a vehicle seat and provide four-way adjustment, said vehicle seat comprising:
a lower seat assembly supported on a mounting assembly to operatively secure said lower seat assembly to a vehicle;
a seat back operatively supported by said lower seat assembly;
a head restraint assembly adapted to provide four-way adjustment, said head restraint assembly including a frame adapted to operatively engage the seat back of a vehicle, said head restraint assembly further including a housing adapted to operatively engage a portion of said frame, said housing including at least one aperture disposed along a horizontal axis perpendicular to said frame, said head restraint assembly further including a cam assembly disposed within said housing adapted to provide fore/aft adjustment of said housing relative to said frame, said cam assembly including a camshaft extending along the horizontal axis and at least two drum assemblies operatively supported by said camshaft, said cam assembly further including a contact plate extending parallel to said camshaft and adapted to releasably engage said drum assemblies, said camshaft operatively connected to said contact plate to provide releasable engagement between said contact plate and said drum assemblies, said head restraint assembly further including a control member adapted to operatively engage said cam assembly and provide for fore/aft and vertical adjustment in response to user input.

17. The head restraint assembly as set forth in claim 16 wherein said cam assembly further includes at least two cam lobes disposed along said camshaft, said cam lobes adapted to operatively engage said contact plate to releasably engage said drum assemblies thereby providing fore/aft adjustment of said housing about said drum assemblies.

18. The head restraint assembly as set forth in claim 16 wherein each of said drum assemblies include an annular outer surface about which said housing may rotate during fore/aft adjustment of said head restraint assembly, said annular outer surface including a plurality of aligned detents in spaced relation relative to each other to define a predetermined number of fore/aft adjustment positions, said detents adapted to receive a portion of said contact plate tensionally supported by said housing to provide a positive stop for each adjustment position in both the fore and aft direction.

19. The head restraint assembly as set forth in claim 16 wherein said drum assemblies further include a duct extending through said drum assemblies along the horizontal axis of said housing adapted to receive the terminal ends of said camshaft and a conduit extending through said drum assemblies adapted to receive said frame.

20. The head restraint assembly as set forth in claim 16 further including at least two slide carriages, each of said slide carriages including a base operatively connected to said drum assembly, said base including at least one orifice adapted to receive said frame, said slide carriages further including at least one sidewall extending from said base, said sidewall adapted to communicate with said camshaft through axial movement during vertical adjustment of said head restraint assembly.

* * * * *